United States Patent
Pliner

(10) Patent No.: US 9,301,101 B2
(45) Date of Patent: Mar. 29, 2016

(54) PROBABILISTIC LOCATION DETERMINATION FOR PRECISION MARKETING

(71) Applicant: Cellco Partnership, Basking Ridge, NJ (US)

(72) Inventor: Vadim Pliner, Fair Lawn, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 302 days.

(21) Appl. No.: 14/018,955

(22) Filed: Sep. 5, 2013

(65) Prior Publication Data

US 2015/0065173 A1 Mar. 5, 2015

(51) Int. Cl.
*H04W 4/04* (2009.01)
*G01S 5/02* (2010.01)
*H04W 4/02* (2009.01)

(52) U.S. Cl.
CPC .. *H04W 4/04* (2013.01); *G01S 5/02* (2013.01); *G01S 5/0278* (2013.01); *H04W 4/022* (2013.01)

(58) Field of Classification Search
CPC ....... H04W 4/02; H04W 64/00; H04W 4/021; H04W 4/023; H04W 4/028; H04W 64/003; H04W 4/025; H04W 4/04
USPC ............................................ 455/456.1, 456.3
See application file for complete search history.

(56) References Cited

U.S. PATENT DOCUMENTS

| | | | |
|---|---|---|---|
| 6,842,620 B2 | 1/2005 | Smith et al. | |
| 7,715,849 B2 * | 5/2010 | Spirito | .................. H04W 64/00 455/404.2 |
| 7,751,829 B2 * | 7/2010 | Masuoka | ............ G01S 5/02094 455/41.2 |
| 8,200,247 B1 * | 6/2012 | Starenky | ................ G01C 21/28 455/404.2 |
| 8,428,622 B1 | 4/2013 | Zhang | |
| 8,489,117 B2 * | 7/2013 | Shen | .......................... G01S 5/02 342/118 |
| 8,818,717 B2 * | 8/2014 | Cardoso, Jr. | ............ G01C 21/00 701/426 |
| 2004/0072577 A1 * | 4/2004 | Myllymaki | ............... G01S 5/02 455/456.1 |
| 2005/0131635 A1 * | 6/2005 | Myllymaki | ............... G01S 5/02 701/435 |
| 2005/0192024 A1 * | 9/2005 | Sheynblat | ............. G01S 5/0263 455/456.1 |
| 2011/0099048 A1 * | 4/2011 | Weiss | ..................... G06Q 10/00 705/7.34 |
| 2014/0221005 A1 * | 8/2014 | Marshall | ................. G01S 5/021 455/456.1 |
| 2015/0005007 A1 * | 1/2015 | Schewel | .................. H04W 4/02 455/456.3 |
| 2015/0169794 A1 * | 6/2015 | Maennel | ............. G06F 17/5009 703/2 |

* cited by examiner

Primary Examiner — Magdi Elhag

(57) ABSTRACT

Location methods for mobile devices and location systems are provided. A location method for a mobile station includes identifying a current probable location of the mobile station, defined by a position of the mobile station and an uncertainty of the position. A predetermined area is identified which at least partially overlaps the identified current probable location of the mobile station. A probability distribution of the mobile station proximate to the predetermined area from the position of the mobile station and the uncertainty of the position can then be used to estimate a probability that the mobile station is proximate to the predetermined area. An exemplary method may also involve associating an event for the mobile station based on the estimated probability.

20 Claims, 5 Drawing Sheets

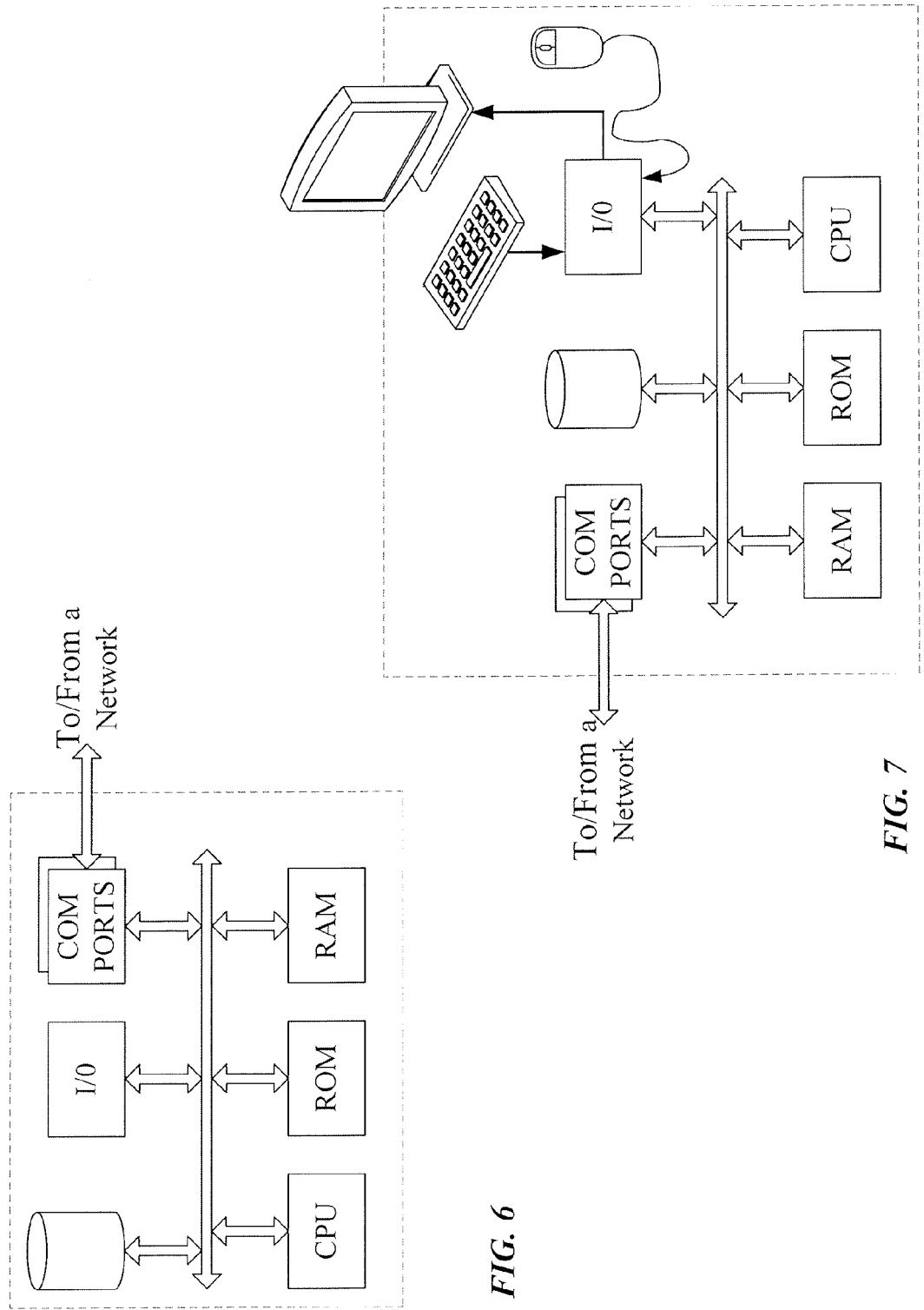

PROBABILISTIC LOCATION DETERMINATION FOR PRECISION MARKETING

BACKGROUND

In recent years, mobile communication services have expanded and increased in popularity around the world. Many advanced networks offer wireless mobile communication service for voice calls, mobile phone messaging services (e.g., text and/or multimedia) and data communications. The data services, for example, enable surfing the world wide web, e.g., via a browser. The speeds of the data communications services have steadily increased as service providers have migrated the networks to newer generation technologies with broadband data communication capabilities, and the mobile stations have steadily advanced to take advantage of the new network technologies. The data communication capabilities of the mobile stations and the broadband data communication services offered by the networks enable users to perform more and more tasks from their mobile stations.

Shopping has also evolved with the evolution to telecommunications technologies. On-line shopping is now commonplace, and, increasingly, users can do their on-line shopping using their mobile stations. Although on-line shopping can be for traditional goods and services, on-line shopping from a mobile station is often related to shopping for content for downloading to the mobile station. Examples of mobile station content items include, without limitation, media, games, messaging, social networks, stores, and any other applications or information for use on a mobile phone.

It may be desirable to provide recommendations for various services which may be of interest to the mobile station user. For example, on-line items for purchase, mobile station content items, venues which may be in a vicinity of the mobile station user, etc. A behavior of the mobile station user may be monitored, in order to select appropriate recommendations or the like for various mobile device users. One method of monitoring user behavior may include monitoring the mobile station user's location. For example, a party serving mobile device users may want to analyze location related behavior over time of various users, e.g. number of calls while at or near a location over some period, for use in marketing efforts to some of those users and/or to other users predicted to behave in a similar manner. However, it may be difficult to determine a precise location of the mobile station user.

Hence, a need exists for improved technologies for locating a mobile station user, to provide improved recommendations or other types of marketing event related content to the user.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a simplified functional block diagram of a computer that may be configured as a host or server, for example, to function as the location server in the system of FIG. 1.

FIG. 7 is a simplified functional block diagram of a personal computer or other work station or terminal device.

DETAILED DESCRIPTION OF EXAMPLES

Figure 1:
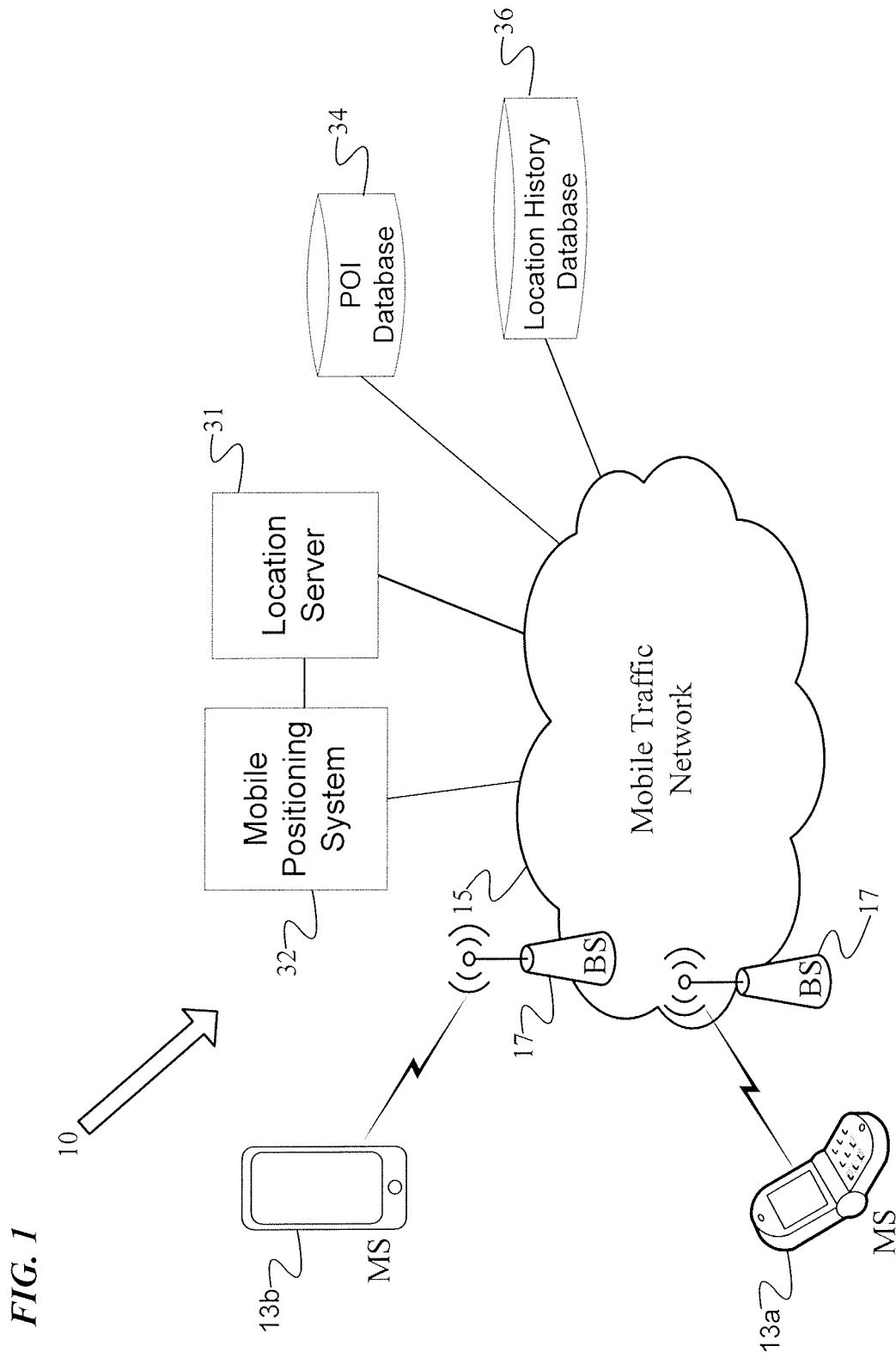
FIG. 1 is a high-level functional block diagram of an example of a system of a network/devices that provides various communications for mobile stations and supports an example of a system for implementing a location method for a mobile station.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various methods disclosed herein relate to locating a mobile station, to estimate a probability that a mobile station is proximate to a predetermined area. Based on the estimated probability, an event may be associated with the mobile station (e.g., assigned or scheduled for the mobile station). In general, the predetermined area may be a predefined geographic area of any point of interest (POI) including, but not limited to, businesses (e.g., stores, hotels, gas stations, etc.), recreational facilities (e.g., stadiums, theme parks, etc.), public facilities (e.g., schools, hospitals, etc.), cultural facilities (e.g., museums, performing arts centers, etc.), transportation facilities (e.g., airports, train stations, etc.), geographical points of interest (e.g., parks, beaches, etc.), etc. Events may include recommendations for content (e.g., media, games, messaging, social networks, stores), reservations, order placements, e-coupons, mailed coupons, advertisements, survey requests and any other information for use on a mobile phone which may be of interest to the mobile station user.

Based on the probable location of the mobile station, an event of possible interest to a user may be scheduled or assigned. The device location alone, however, may not provide enough information to produce suitable recommendations. To improve the precision of the associated events, the device location may be compared against nearby POIs, for example, to determine whether the mobile station user frequents a particular coffee shop or frequents a particular clothing store. Given the POI, for example, events may by further tailored to the mobile station user.

The device location may be determined by various mobile positioning systems (such as via trilateration, triangulation, etc.), based on a communication by the mobile station (e.g., a phone call, a text message, an email message). In general, the mobile positioning system provides positioning information and may provide a time stamp of the communication. The positioning information, however, may include a degree of uncertainty. Thus, such positioning information represents a probable location of the mobile station.

For example, the probable location may include an estimated latitude and longitude (collectively referred to herein as a position) and a precision for each probable location (also referred to herein as an uncertainty of position). For example, a given position may have reported precision of 300 meters, meaning that the actual location of the mobile station user may be within 300 meters of the position with a probability of 0.9 (90%). Because of the uncertainty of the probable location, it may be difficult to directly identify POIs that overlap with the mobile station location. There may also be some uncertainty in the shape and/or orientation of the POI areas. Thus, exemplary location methods estimate the probability that the mobile station user is proximate to a POI.

An exemplary location method involves identifying a current probable location of the mobile station. The current probable location may be defined by a position of the mobile station and an uncertainty of the position. The current probable location may be identified, for example, based on a communication by the mobile station. A predetermined area (e.g., including a POI) may be identified which at least partially overlaps the identified current probable location of the mobile station. For example, a database including location and area information of a number of predetermined areas may be compared to the current probable location. A probability distribution of the mobile station proximate to the predetermined area may be determined. For example, the probability distribution may be determined from the position of the mobile station and the uncertainty of the position. A probability that the mobile station is proximate to the predetermined area may be estimated from the probability distribution, and an event for the mobile station may be associated based on the estimated probability. For example, if it is determined that the mobile station is proximate a coffee shop, recommendations for placing an order at the coffee shop may be provided to the mobile station user via a display of the mobile station. As another example, recommendations for applications downloaded by other mobile station users who have frequented the coffee shop may be presented to the mobile station user.

The estimated probability may be used to update a location history of the mobile station. Associating of the event may be based on the updated location history. The method may be repeated over a predetermined time period, to determine a plurality of estimated probabilities. The plurality of estimated probabilities may be aggregated, to improve the estimation result. Various weightings may also be applied to the plurality of estimated probabilities, for example, based on predetermined criteria. For example, the estimated probabilities may be weighted according to the time of day, the day of the week and/or a frequency of the mobile station proximate to the predetermined area. The weighting may be uniform or non-uniform. For example, newer probability estimates may be weighted higher than older probability estimates.

Computation of the probability estimate may be performed many times over a time period. For example, a probability estimate may be determined each time a message is received from each mobile station in a coverage area. Accordingly, it may be desirable for the probability estimation to be computationally efficient.

According to an example, the probability distribution may include a first probability distribution associated with a radius of the predetermined area and a second probability distribution associated with the radius of the predetermined area and a distance between the mobile station and the predetermined area. The second probability distribution may be approximated by a Bessel function. The estimated probability may be determined from a mean value of a combination of the first and second probability distributions over a range of radius values associated with the predetermined area. The first and second probability distributions are described further below with respect to eqs. 4-6.

Reference now is made in detail to the examples illustrated in the accompanying drawings and discussed below. FIG. 1 illustrates a system 10 offering a variety of mobile communication services, including location methods for mobile station users. System 10 may associate events for mobile stations 13 based on a probability that the mobile station is proximate a predetermined area. The example shows simply two mobile stations (MSs) 13a and 13b as well as a mobile communication network 15. The stations 13a and 13b are examples of mobile stations that may be used for the location method. However, the network will provide similar communications for many other similar users as well as for mobile devices/users that do not participate in the location method. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 are capable of voice telephone communications through the network 15, and for the location method. The exemplary devices 13a and 13b are capable of data communications through the particular type of network 15 and the users thereof typically will have subscribed to data service through the network).

The network 15 allows users of the mobile stations such as 13a and 13b (and other mobile stations not shown) to initiate and receive telephone calls to each other as well as through the public switched telephone network (PSTN) (not shown) and telephone stations (not shown) connected to the PSTN. The network 15 typically offers a variety of data services via a global network (e.g., the Internet) (not shown), such as downloads, web browsing, email, etc. The mobile stations 13a and 13b of users of the location method also can receive and execute applications written in various programming languages, as discussed more later.

Mobile stations 13 can take the form of portable handsets, smart-phones or personal digital assistants, although they may be implemented in other form factors. Program applications, including an application to assist in the location method and/or any application purchased via the location method can be configured to execute on many different types of mobile stations 13. For example, a mobile station application can be written to execute on a binary runtime environment for mobile (BREW-based) mobile station, a Windows Mobile based mobile station, Android, iOS iPhone or iPad, Java Mobile, or RIM based mobile station such as a BlackBerry or the like. Some of these types of devices can employ a multi-tasking operating system.

The mobile communication network 15 can be implemented by a number of interconnected networks. Hence, the overall network 15 may include a number of radio access networks (RANs), as well as regional ground networks interconnecting a number of RANs and a wide area network (WAN) interconnecting the regional ground networks to core network elements. A regional portion of the network 15, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17. Later generation mobile networks utilize wireless access elements, each referred to as an eNodeB, to provide functions similar to those of a base station; but for convenience, the discussion here will generally include eNodeBs and other network wireless access devices under the general term base station.

The radio access networks can also include a traffic network represented generally by the cloud at 15, which carries the user communications and data for the mobile stations 13 between the base stations 17 and other elements with or through which the mobile stations communicate. It will be understood that the various network elements can communicate with each other and other aspects of the mobile communications network 15 and other networks (e.g., a PSTN and the Internet) either directly or indirectly.

Although not shown, the carrier may also operate a number of systems that provide ancillary functions in support of the communications services and/or application services provided through the network 15, and those elements may communicate with other nodes or elements of the network 10 via one or more private IP type packet data networks (sometimes referred to as an Intranet), i.e., a private network. Examples of such systems may include one or more application servers and related authentication servers.

A mobile station 13 communicates over the air with a base station 17 and through the traffic network 15 for various voice and data communications. If the mobile service carrier offers the location service, the service may be hosted on a location server 31, for communication via the network 15. Alternatively, programming for the location service may be distributed across multiple components of system 10. For a given service, including the location service, an application program within the mobile station may be considered as a 'client' and the programming at location server 31 may be considered as the 'server' application for the particular service.

Figure 3:
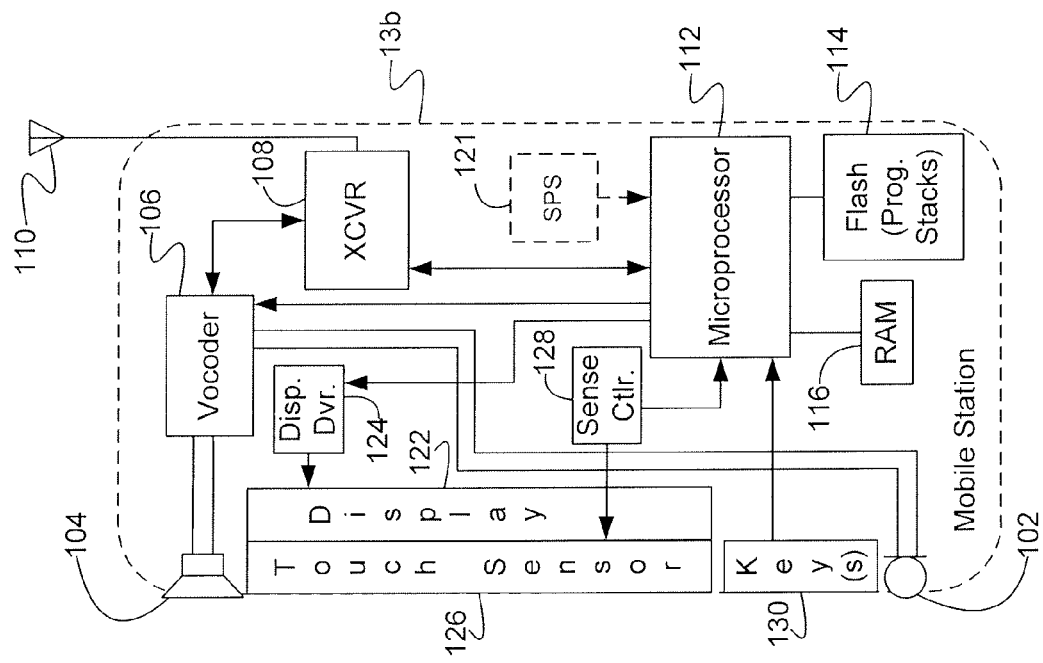
FIG. 3 is a high-level functional block diagram of an exemplary touch screen type mobile station as may utilize the location method through a network/system like that shown in FIG. 1.

The location server 31 may be configured to receive mobile positioning information for mobile station 13 from mobile positioning system 32. For example, the location server 31 may receive the mobile positioning information through traffic network 15. Alternatively, location server 31 may receive the mobile positioning information from mobile station 13 (for example, from a satellite positioning system (SPS) 121, as shown in FIG. 3), through traffic network 15.

The mobile positioning system 32 may be of any type. For example, it may use base station triangulation to determine the mobile positioning information based on the nearest base station identification. The mobile positioning system 32, may, in addition or instead, use measurements of signaling characteristics between the mobile station 13 and multiple base stations, e.g., such as by signal-strength fingerprinting. The mobile positioning system 32 may, in addition or instead, include a satellite positioning system (SPS), such as a Global Positioning system (GPS) chip set configured to determine the geographic location of the mobile station 13 based on trilateration of positioning signals from global satellites. The mobile positioning system 32 may, in addition or instead, include an architecture that uses both a SPS as well as network elements to determine position, such as Assisted GPS (AGPS). In general, SPS data may provide a more precise mobile station position (i.e., with less uncertainty) compared with base station triangulation (i.e., having increased uncertainty). SPS data, however, may not be available for some wireless networks operating today and/or for some mobile station locations (e.g. inside buildings or the like). Each mobile positioning technique includes a different uncertainty of position. For example, mobile positioning techniques, from a highest uncertainty to a lowest uncertainty, include cell identification (accuracy within about 200 m), triangulation (accuracy between about 100 m to about 500 m), fingerprinting (accuracy within about 10 m), SPS (accuracy between about 5 m to about 40 m), AGPS (accuracy between about 1 m to about 10 m).

The location server 31 is configured to perform functions including functions to: identify a current probable location of the mobile station 13 based on the mobile positioning information; identify at least one predetermined area (also referred to herein as predetermined area(s)) from the point of interest (POI) database 34 which at least partially overlaps the identified current probable location; determine a probability distribution of the mobile station proximate to the predetermined area(s), estimate a probability that the mobile station 13 is proximate to the predetermined area(s) from the probability distribution; and associate an event for the mobile station 13 based on the estimated probability. The location server 31 may also update the location history database 36 based on the estimated probability. In addition, the location server 31 may be configured to perform functions to determine a plurality of probability estimates over a predetermined time period and form an aggregate estimate from the plurality of probability estimates. The location related functions of the location server 31 are described further below with respect to FIGS. 4 and 5. The associating of the event may then be based on the aggregate estimate.

The location server 31 may be configured to perform the functions described herein only for devices/users who have provided authorization to share information. The location server 31, for example, may confirm the authorization prior to performing the location method.

The point of interest (POI) database 34 may include records for a plurality of POIs (e.g., businesses, recreational facilities, public facilities, cultural facilities, transportation facilities, geographical points of interest, etc.). The records may contain information identifying a position (i.e., latitude and longitude) for the POIs, as well as the area of the POIs (i.e., predetermined areas).

The location history database 36 may store a location history of the mobile station 13. The location history may include indications of POIs that the mobile station 13 has likely visited, based on the estimated probability (as determined by the location server 31). The location history may be updated when the location server 31 determines that the mobile station 13 is proximate a POI. The updated location history in database 36 may be used by the location server 31 to associate the event with the mobile device.

Although FIG. 1 illustrates POI database 34 and location history database 36 as separate databases, databases 34 and 36 may be part of one database. Although FIG. 1 illustrates POI database 34 and location history database 36 as separate physical databases connected to the network 15, POI database 34 and/or location history database may reside on mobile station 13.

Associated events (based on the location history) under consideration here may be delivered to touch screen type mobile stations as well as to non-touch type mobile stations. Hence, the simple example shows the mobile station (MS) 13*a* as a non-touch type mobile station and shows the mobile station (MS) 13 as a touch screen type mobile station. Implementation of the on-line location service may involve some execution of programming in the mobile stations as well as implementation of user input/output functions and data communications through the network 15, from the mobile stations.

It may be useful to consider the functional elements/aspects of two exemplary mobile stations 13*a* and 13*b*, at a high-level.

Figure 2:
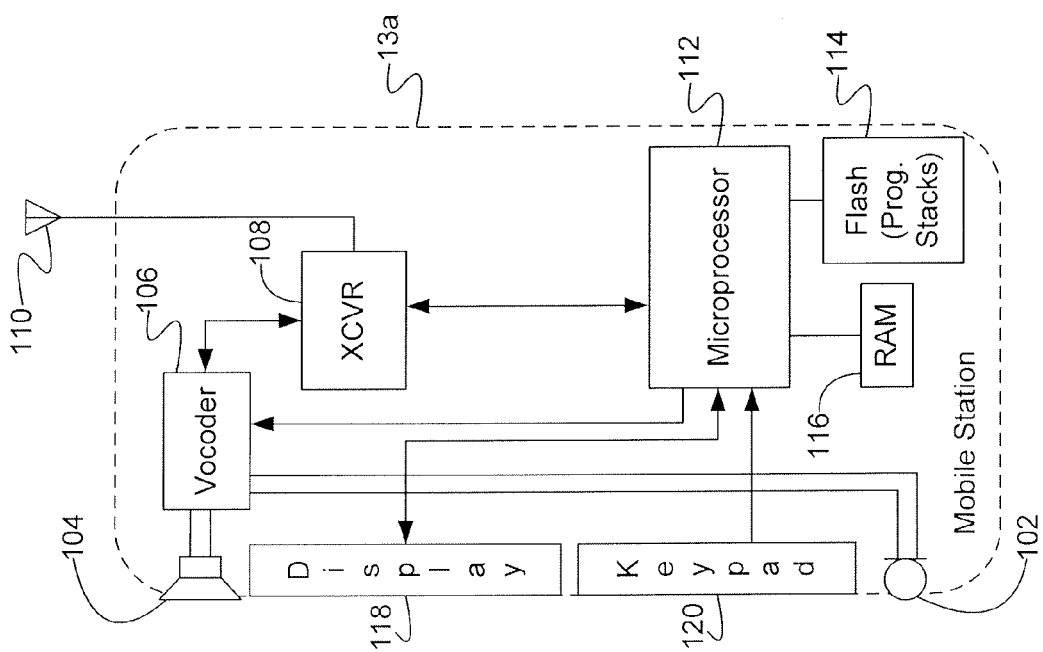
FIG. 2 is a high-level functional block diagram of an exemplary non-touch type mobile station as may utilize the location method through a network/system like that shown in FIG. 1.

For purposes of such a discussion, FIG. 2 is a block diagram illustration of an exemplary non-touch type mobile station 13*a*. Although the mobile station 13*a* may be a smartphone or may be incorporated into another device, such as a personal digital assistant (PDA) or the like, for discussion purposes, the illustration shows the mobile station 13*a* is in the form of a handset. The handset embodiment of the mobile station 13*a* functions as a normal digital wireless telephone station. For that function, the station 13*a* includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications.

For digital wireless communications, the handset 13*a* also includes at least one digital transceiver (XCVR) 108. Today, the handset 13*a* would be configured for digital wireless communications using one or more of the common network technology types. The concepts discussed here encompass embodiments of the mobile station 13*a* utilizing any digital transceivers that conform to current or future developed digital wireless communication standards. The mobile station 13*a* may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13*a* and the communication network. Each transceiver 108 connects through radio frequency (RF) send and receive amplifiers (not separately shown) to an antenna 110. The transceiver 108 may also support various types of mobile messaging services, such as short message service (SMS), enhanced messaging service (EMS) and/or multimedia messaging service (MMS).

The example mobile station 13*a* includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 112 serves as a programmable controller for the mobile station 13*a*, in that it controls all operations of the mobile station 13*a* in accord with programming that it executes, for all normal operations, and for operations involved in the location procedure under consideration here and any location or event related communications. In the example, the mobile station 13*a* includes flash type program memory 114, for storage of various "software" or "firmware" program routines and mobile configuration settings, such as mobile directory number (MDN) and/or mobile identification number (MIN), etc. The mobile station 13*a* may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13*a* includes a processor, and programming stored in the flash memory 114 configures the processor so that the mobile station is capable of performing various desired functions, including in this case the functions involved in the location technique and any associated events.

FIG. 3 is a block diagram illustration of an exemplary touch screen type mobile station 13*b*. Although possibly configured somewhat differently, at least logically, a number of the elements of the exemplary touch screen type mobile station 13*b* are similar to the elements of mobile station 13*a*, and are identified by like reference numbers in FIG. 3. For example, the touch screen type mobile station 13*b* includes a microphone 102, speaker 104 and vocoder 106, for audio input and output functions, much like in the earlier example. The mobile station 13*b* also includes at least one digital transceiver (XCVR) 108, for digital wireless communications, although the handset 13*b* may include an additional digital or analog transceiver. The concepts discussed here encompass embodiments of the mobile station 13*b* utilizing any digital transceivers that conform to current or future developed digital wireless communication standards. As in the station 13*a*, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13*b* and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the location procedure under consideration here and any location or event related communications. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, as outlined above, the mobile station 13b includes a processor; and programming stored in the flash memory 114 configures the processor so that the mobile station is capable of performing various desired functions, including in this case the functions involved in the location technique and any associated events.

The mobile station 13b may include optional satellite positioning system (SPS) 121 to determine the geographic location of the mobile station 13, based on positioning signals from global satellites. The SPS 121 may provide mobile positioning information to the location server 31 (FIG. 1) for the location method.

In the example of FIG. 2, the user interface elements included a display and a keypad. The mobile station 13b may have a limited number of keys 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver (disp. dvr.) 124, to present visible outputs to the device user. The mobile station 13b also includes a touch/position sensor 126. The sensor 126 is relatively transparent, so that the user may view the information presented on the display 122. A sense circuit (sense ctlr.) 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output, including with respect to some location related functions and/or location related events for the user delivered via the mobile station.

The structure and operation of the mobile stations 13a and 13b, as outlined above, are described to by way of example, only.

Figure 4:
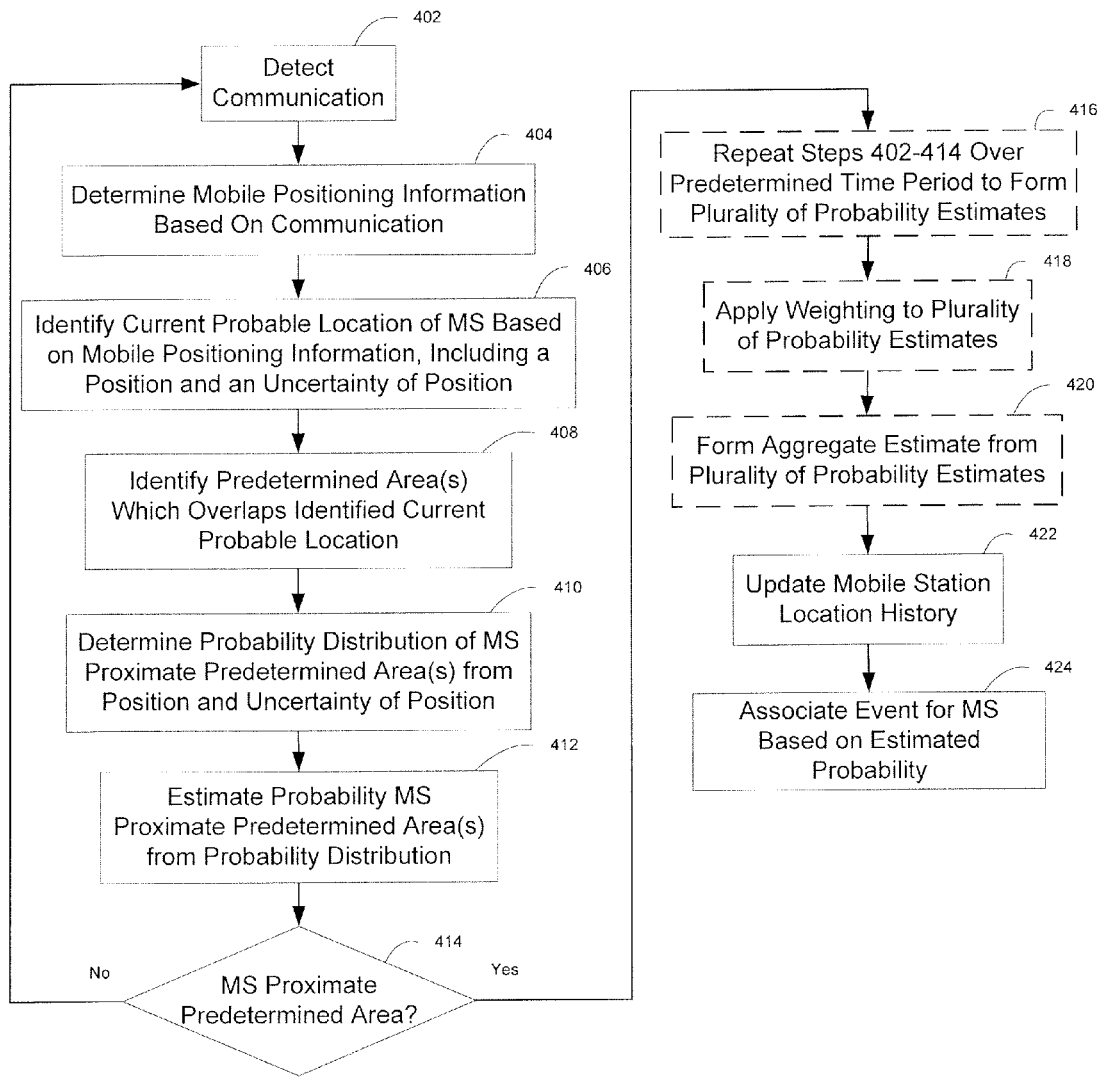
FIG. 4 is a flow chart of an exemplary location method for a mobile station.
Figure 5:
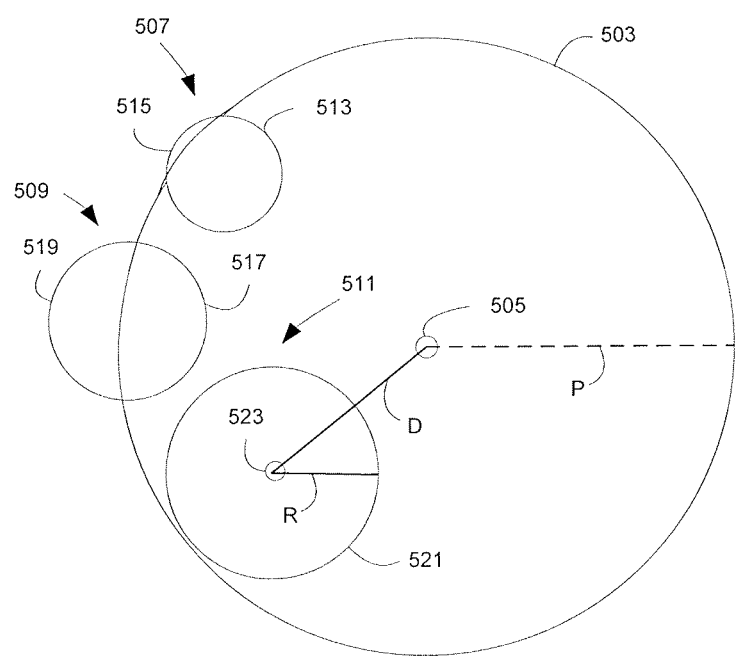
FIG. 5 is a diagram illustrating an example of a probable location of a mobile station and several overlapping predetermined areas, which may be useful for describing the exemplary location method shown in FIG. 4.

Referring now to FIGS. 4 and 5, a location based method for providing improved services to a user is described. In particular, FIG. 4 is a flow diagram of an exemplary location method for the mobile station 13 (FIG. 1); and FIG. 5 is a diagram illustrating an example current probable location 503 of a mobile station and several overlapping predetermined areas (507, 509, 511), which may be useful for describing the location method shown in FIG. 4. It may be appreciated that the users of the location method may agree to share information via opting in explicitly, opting in implicitly as part of a download agreement, opting in when an application is launched, or otherwise. Each user has the ability to opt out of the location service, so that the user data of a non-consenting user will not be stored or manipulated or sold to third parties. To the extent the embodiments herein collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

At step 402, a communication by the mobile station 13 may be detected, for example, by mobile positioning system 32. The communication may include a phone call, a text message, an email, or any suitable wireless signaling data. At step 404, responsive to the detected communication, mobile positioning information of the mobile station 13 may be determined based on the communication, for example, by mobile positioning system 32. In general, each communication is processed by network 15 using mobile positioning system 32 to return mobile positioning information of the mobile station 13. The mobile positioning information is embedded in the communication (e.g., as SPS data).

At step 406, a current probable location of the mobile station (MS) 13 may be identified, for example, by location server 31 responsive to the mobile positioning information received from mobile positioning system 32. The mobile positioning information may include a position of the mobile station 13 and an uncertainty of the position (i.e., a precision P). As shown in FIG. 5, given the position 505 and the precision (P), the current probable location may be represented as circle 503 having central position 505 and a radius of the precision P. For example, mobile positioning information may include a latitude, a longitude and a precision of 300 meters with a probability of 90%. The latitude and longitude may be converted to central position 505 and the precision of 300 meters may be represented as the radius (i.e., P) of circle 503. In the description herein, circle 503 may also be referred to as current probable position 503. It may be appreciated that different types of mobile positioning techniques may produce different uncertainties of the mobile station position. For example, GPS techniques may produce less uncertainty than telecommunication proximity techniques such as trilateration of cell presence.

Referring to FIG. 4, at step 408, responsive to the identified current probable location, a predetermined area(s) may be identified which at least partially overlaps the identified current probable location. For example, location server 31 may compare the current probable location 503 with predetermined areas in the POI database 34.

For example, in FIG. 5, three predetermined areas 507, 509 and 511 may be identified which overlap with current probable location 503. For example, predetermined area 507 may include region 513 within circle 503 and region 515 outside of circle 503. Predetermined area 509 may include region 517 within circle 503 and region 519 outside of circle 503. Predetermined area 511 may only include region 521 within circle 503. Predetermined areas 507, 509 and 511 may have similar-sized areas or differently-sized areas. According to another example, the predetermined area(s) may not overlap. The current probable location (circle 503 in FIG. 5) identifies the area, for example, with 90% probability. Accordingly, there is still a 10% chance that the actual location is outside the circle. For example, if predetermined area 509 was placed completely outside circle 503, there is a positive probability that the actual location is within area 509.

Although the POI database 34 may provide area information for POIs, the POI database 34 may not provide an exact shape and orientation of the POIs. According to an example, each predetermined area (i.e., POI) may be represented as a circle. Thus, each of predetermined areas 507, 509 and 511 may be defined by a central position (for example, position 523 in predetermined area 511) and a corresponding radius (R) (where the area information may be approximately represented as $\pi R^2$). It is understood that FIG. 5 represents an example, and that, in general, one or more predetermined areas may be identified which overlap with current probable location 503. Although the predetermined areas 507, 509 and 511 are represented as circles in FIG. 5, it is understood that predetermined areas 507, 509 and 511 may be represented by any suitable shape, or may be based on an actual shape and/or orientation.

Referring to FIGS. 4 and 5, at step 410, responsive to the identified predetermined area(s), a probability distribution of the mobile station 13 proximate to the predetermined area(s) may be determined, based on the position 505 and the uncertainty of the position (i.e., precision P). At step 412, a probability that the mobile station 13 is proximate to the predetermined area may be determined from the probability distribution (step 410). For example, location server 31 may determine a probability distribution and estimate the probability for the mobile station 13 proximate to each of predetermined areas 507, 509 and 511. The probability distribution and estimated probability are described further below with respect to predetermined area 511. It is understood that probability distributions and estimated probabilities for predetermined areas 507 and 509 may be similarly determined.

In general, the probability that the mobile station 13 is proximate to a predetermined area 511 may be represented by the cumulative distribution function (CDF) in eq. (1) as:

$$CDF(R, D) = \iint_C p(x, y) dx dy \qquad \text{eq. (1)}$$

where R represents the radius of predetermined area 511, D represents the distance between position 505 (of current probable location 503) and position 523 (of predetermined area 511), C represents the circle of predetermined area 511, and p(x, y) represents the probability density function (pdf) of a bivariate normal distribution with independent coordinates. In eq. (1), it is assumed that the current probable location 503 and predetermined area 511 are in Cartesian coordinates (i.e., positioned relative to an X and Y axis), with central position 505 of the current probable location 503 at the origin (0, 0) and position 523 of the predetermined area 511 lying on the Y axis at coordinates (O, −D).

The pdf p(x, y) may be represented in Cartesian coordinates by eq. (2) as:

$$p(x, y) = \frac{1}{2\pi\sigma^2} e^{\frac{-(x^2+y^2)}{2\pi\sigma^2}}. \qquad \text{eq. (2)}$$

The CDF (eq. (1)) may be converted to polar coordinates, where x=r cos θ, y=r sin θ−D and $x^2+y^2=D^2+r^2-2Dr \sin \theta$. In polar coordinates (with the origin being at position 523 of predetermined area 511), the CDF may be represented by eq. (3) as:

$$CDF(R, D) = \frac{1}{2\pi\sigma^2} \int_0^{2\pi} \int_0^R r \, e^{\frac{-(D^2+r^2-2Dr \sin \theta)}{2\sigma^2}} dr \, d\theta. \qquad \text{eq. (3)}$$

The inventor has determined that the CDF shown in eq. (3) may rewritten as shown in eq. (4):

$$CDF(R, D) = \frac{e^{\frac{-D^2}{2\sigma^2}}}{2\pi\sigma^2} \int_0^R r \, e^{\frac{-r^2}{2\sigma^2}} \left( \int_0^{2\pi} e^{\frac{Dr \sin \theta}{\sigma^2}} d\theta \right) dr. \qquad \text{eq. (4)}$$

As shown in eq. (4), the probability distribution function may be represented as a first probability distribution (under the leftmost integral with respect to radius values r) and a second distribution (under the rightmost integral with respect to angle values θ). The first probability distribution is associated with the radius of the predetermined area 511. The second probability distribution is associated with the radius of the predetermined area 511 and the distance D between the position 505 of the mobile station 13 and the position 523 of the predetermined area 511.

The double integral in eq. (4) may be reduced to a single integral as shown in eq. (5):

$$CDF(R, D) = \frac{e^{\frac{-D^2}{2\sigma^2}}}{\sigma^2} \int_0^R r \, e^{\frac{-r^2}{2\sigma^2}} I_0 \left( \frac{Dr}{\sigma^2} \right) dr \qquad \text{eq. (5)}$$

where $$\int_0^{2\pi} e^{\frac{Dr \sin \theta}{\sigma^2}} d\theta = 2\pi \, I_0 \left( \frac{Dr}{\sigma^2} \right). \qquad \text{eq. (6)}$$

In eq. (5), $I_0$ represents a modified Bessel function of the first kind.

In general, the integral in eq. (5) may not be explicitly evaluated. Thus, to estimate the probability that the mobile station 13 is proximate the predetermined area 511 (step 412 in FIG. 4), eq. (5) may be numerically approximated by the mean of the integrated function's values at predetermined radius values r between 0 and R (the radius of predetermined area 511). For example, a first plurality of values may be determined for $$r\, e^{\frac{-r^2}{2\sigma^2}}$$

(the first probability distribution) in eq. (5) and a second plurality of values may be determined for $$I_0\left(\frac{Dr}{\sigma^2}\right)$$

(the second probability distribution) in eq. (5). The first plurality of values and the second plurality of values may be combined (e.g., multiplied) and the mean value of the combined values may be used to estimate the probability (i.e., form a probability estimate).

The Bessel function $I_0$ (in eq. (5)) may be numerically approximated. According to an example, the Bessel function may be approximated by a polynomial expansion. For example, a polynomial expansion of the Bessel function may include:

$$x^{\frac{1}{2}}e^{-x}I_0(x) = .39894228 + .01328592t^{-1} + .00225319t^{-2} -$$
$$.00157565t^{-3} + .00916281t^{-4} - .02057706t^{-5} +$$
$$.02635537t^{-6} - .01647633t^{-7} + .00392377t^{-8} + \in$$

where $|\in|<1.9\times10^{-7}$, $t=x/3.75$ and $x\geq3.75$. Or, if $x\leq3.75$, then the polynomial expansion of the Bessel function may include:

$$I_0(x) = 1 + 3.5156229t^2 + 3.0899424t^4 + 1.2067492t^6 +$$
$$0.2659732t^8 + 0.0360768t^{10} + 0.0045813t^{12} + \in$$

where $|\in|<1.6\times10^{-7}$, $t=x/3.75$ and $x\leq3.75$. It may be appreciated that at the value x=3.75, both of the above polynomial expansions yield the same result. In an example, the polynomial expansion may be truncated, to reduce a computational load on the location server 31 (thus increasing a computational speed of the location server 31 for approximating eq. (5)).

The CDF in eq. (3) may be numerically approximated, for example, by an equidistant rectangular grid of radius (r) values (between 0 and R) and angle (θ) values (between 0 and 2π). In contrast, the CDF in eq. (5) may be numerically approximated from an array of radius (r) values (between 0 and R). Thus, the CDF in eq. (5) may be used to estimate the probability using fewer values (e.g., radius values as opposed to radius and angle values in eq. (3)), while producing the same estimate accuracy as the CDF in eq. (3). Thus, the computational speed for estimating the probability may be increased by using the CDF of eq. (5) (without reducing the accuracy of the estimate).

The computational complexity of numerically evaluating the double integral in eq. (3) is quite high. The inventor has determined that the rightmost integral in eq. (3) (with respect to angle values θ) can be replaced by a modified Bessel function of the first kind. The inventor has also determined that the modified Bessel function can be numerically approximated by a polynomial expansion, thus, greatly reducing the computational complexity of the CDF.

Referring back to FIG. 4, at step 414, it is determined, for example, by location server 31, whether the mobile station 13 is proximate to the predetermined area(s), responsive to the estimated probability (step 412). For example, the probability may be estimated based on eq. (5), by location server 31, and may be compared to a predetermined threshold. If the estimated probability is above the predetermined threshold, the location server 31 may determine that the mobile station 13 is proximate to the predetermined area (such as predetermined area 511 shown in FIG. 5).

The proximity to the predetermined area(s) is determined by the uncertainty of the position, which factors into the estimated probability. For example, if there is significant overlap between predetermined area 521 (FIG. 5) and the current probable position 503 of the mobile station 13, then it is more likely that the mobile station 13 is proximate to the predetermined area (i.e., the result will be a higher estimated probability). Conversely, if there is little or no overlap between a predetermined area and the current probable position 503 of the mobile station 13, then it is less likely that the mobile station 13 is proximate to the predetermined area. According to an example, non-user specific data (such as a general popularity of a predetermined area) is taken into account for the predetermined area.

As another example, if there are two or more predetermined areas, steps 410-414 may be repeated for each predetermined area. The location server 31 may determine whether the mobile station 13 is proximate to one of the predetermined areas, for example, based on a highest probability estimate among all of the overlapping predetermined areas.

As another example, in addition to the estimated probability, the location server 31 may take into account behavioral characteristics of the mobile station user to determine whether the mobile station 13 is proximate to the predetermined area. For example, the location server 31 may consider whether the mobile station user has previously frequented the predetermined area, or has expressed some previous interest in content which may be related to the predetermined area. The location server 31 may also consider non-user specific data to determine whether the mobile station 13 is proximate to the predetermined area. For example, the location server 31 can consider a general popularity of a predetermined area. Accordingly, a coffee shop in a mall is more likely to be frequented than a golf store or a jewelry store. The behavioral characteristics may also be used to distinguish between two or more predetermined areas (such as predetermined areas 509 and 511) which may have similar estimated probabilities.

If it is determined, at step 414, that the mobile station 13 is not proximate to the predetermined area(s), step 414 proceeds to step 402, and steps 402-414 may be repeated.

If it is determined, at step 414, that the mobile station 13 is proximate to the predetermined area(s), step 414 proceeds to optional step 416. At optional step 416, steps 402-414 may be repeated over a predetermined time period to form a plurality of probability estimates. The predetermined time period may include any suitable time period, including, without being limited to, an hour, a day, a week, a month, etc. In general, the predetermined time period is selected so that a desired consistency for behavioral characteristics of interest is obtained. Thus, the time period is long enough to capture the behavioral characteristics of interest while being short enough to eliminate any fads.

By acquiring multiple probability estimates over a predetermined time period, a location accuracy may be improved. For example, the mobile positioning information includes a degree of uncertainty, the shape of the predetermined region may be inaccurate and the mobile phone user may be moving. For example, if the mobile phone user is moving at a rate of speed and/or is rapidly changing their bearing, the mobile station 13 may not be in a position indicative of the user's preference. A single probability estimate may include a higher degree of uncertainty compared with multiple probability estimates. For example, a single probability estimate may be erroneous or may be insufficient to estimate whether the mobile station 13 is at one of several predetermined areas. Thus, multiple probability estimates may collectively reduce the uncertainty of whether the mobile station 13 is proximate the predetermined area.

Also, multiple probability estimates may be used to determine whether the mobile station user frequents one or more types of POIs. Multiple estimates may show a pattern, such as that the mobile station user frequents coffee shops every weekday morning. The type(s) of POIs that the mobile station user frequents, thus, may be used to determine a behavior of the mobile station user.

At optional step 418, a weighting may be applied to the plurality of probability estimates (determined at step 416). For example, the location server 31 may apply a weighting according to a predetermined criteria. The predetermined criteria may include, for example, a time of day, a day of the week or a frequency (i.e., a number of times) of the identified current probable location relative to the predetermined area. For example, a higher weighting may be assigned to noon and a lower weighting may be assigned to midnight for determining whether the mobile station 13 may be proximate a coffee shop. In general, a uniform or non-uniform weighting may be applied. For example, newer probability estimates may be provided with a higher weighting than older probability estimates.

At optional step 420, an aggregate estimate may be formed from the plurality of probability estimates (step 416) or the plurality of weighted probability estimates (step 418). For example, the aggregate estimate may be formed using a moving average of the probability (or weighted) probability estimates. A moving average may be used to smooth out short-term fluctuations and emphasize longer term trends in the probability estimates over the predetermined time period. It is understood that the aggregate estimate may be a function of the mobile station 13 being proximate to a particular POI or to a type of POI. At step 422, the mobile station location history may be updated responsive to the estimated probability (step 412) and/or responsive to the aggregate estimate (optional step 420). For example, the location server 31 may update the location history database 36 (FIG. 1) to indicate that the mobile station 13 is proximate the predetermined area.

At step 424, an event may be associated for the mobile station 13 responsive to the estimated probability. For example, the location server 31 may identify, from the location history database 36, that the mobile phone user is proximate an airport, and may associate events to be sent to the user's mobile station 13 which may be of interest to the user. The events may include, for example, recommendations for trip-related applications (e.g., for hotel reservations, car rental services, etc.), flight information, maps of the airport, applications that other mobile station users who have frequented the airport have downloaded, etc. As another example, the location server 31 may identify that the mobile phone user is proximate a particular restaurant. The location server 31 may control sending of an electronic order form to the mobile station 13 for the restaurant, so that the mobile station user can place an order prior to entering the restaurant. As another example, the location server 31 may schedule electronic coupons to be delivered to the mobile station 13 associated with the restaurant.

As shown by the above discussion, functions relating to the enhanced location service may be implemented on computers connected for data communication via the components of a packet data network, operating as the various servers and/or client mobile stations as shown in FIG. 1. Although special purpose devices may be used, devices implementing server or network database functions or the like also may be implemented using one or more hardware platforms intended to represent a general class of data processing device commonly used to run "server" programming so as to implement the location functions discussed above, albeit with an appropriate network connection for data communication.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the location service. The software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for location based event scheduling, in essentially the manner performed in the implementations discussed and illustrated herein.

FIGS. 6 and 7 provide functional block diagram illustrations of general purpose computer hardware platforms. FIG. 6 illustrates a network or host computer platform, as may typically be used to implement a server, including the network control 31 (FIG. 1). FIG. 7 depicts a computer with user interface elements, as may be used to implement a personal computer or other type of work station or terminal device, although the computer of FIG. 7 may also act as a server if appropriately programmed. It is believed that the general structure and general operation of such equipment as shown in FIGS. 6 and 7 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the location methods outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has a large number of acronyms to refer to various devices, messages and system components. Although generally known, use of several of these acronyms is not strictly standardized. For the convenience of the reader, the following list correlates terms to acronyms, as used by way of example in the detailed description above.

AGPS—Assisted Global Positioning System
BREW—Binary Runtime Environment for Mobile
CDF—Cumulative Distribution Function
CD-ROM—Compact Disk Read Only Memory
CPU—Central Processing Unit
DVD—Digital Video Disk
DVD-ROM—Digital Video Disk Read Only Memory
EMS—Enhanced Messaging Service
EPROM—Erasable Programmable Read Only Memory EEPROM—Electrically Erasable Programmable Read Only Memory
FLASH-EPROM—Flash Erasable Programmable Read Only Memory
GPS—Global Positioning System
IP—Internet Protocol
IR—Infrared
POI—Point of Interest
PROM—Programmable Read Only Memory
RAM—Random Access Memory
RF—Radio Frequency
RIM—Research in Motion
ROM—Read Only Memory
SMS—Short Message Service
SPS—Satellite Positioning System

What is claimed is:

1. A location method for a mobile station, the method comprising:
 identifying a current probable location of the mobile station responsive to a communication of the mobile station through a mobile communication network, the current probable location defined by a position of the mobile station and an uncertainty of the position;
 identifying, by a processor, a predetermined area which at least partially overlaps the identified current probable location of the mobile station;
 determining a probability distribution of the mobile station proximate to the predetermined area from the position of the mobile station and the uncertainty of the position, wherein the probability distribution includes:
  a first probability distribution associated with a radius of the predetermined area, and
  a second probability distribution associated with the radius of the predetermined area and a distance between the mobile station and a position of the predetermined area;
 estimating, by the processor, a probability that the mobile station is proximate to the predetermined area from the determined probability distribution, wherein the estimating includes:
  determining a first plurality of values for the first probability distribution over a range of radius values associated with the predetermined area,
  determining a second plurality of values for the second probability distribution over the predetermined range of radius values,
  combining the first plurality of values and the second plurality of values to form a combined plurality of values,
  determining a mean value of the combined plurality of values, and
  determining the estimated probability from the mean value; and
 associating an event for the mobile station based on the estimated probability.

2. The method of claim 1, the method further comprising:
 updating a location history of the mobile station when it is determined that the mobile station is proximate to the predetermined area, based on the estimated probability, wherein the event is associated based on the updated location history.

3. The method of claim 1, wherein the determining of the second plurality of values includes approximating the second probability distribution by a Bessel function.

4. The method of claim 3, wherein the approximating of the second probability distribution by the Bessel function includes determining a polynomial approximation of a modified Bessel function of a first kind.

5. The method of claim 1, the method further comprising:
 repeating the estimating of the probability over a predetermined time period, to form a plurality of probability estimates.

6. The method of claim 5, the method further comprising:
 forming an aggregate probability estimate from the plurality of probability estimates.

7. The method of claim 6, wherein the aggregate probability estimate includes a moving average of the plurality of probability estimates.

8. The method of claim 6, wherein the forming of the aggregate probability estimate includes applying a weighting to each of the plurality of probability estimates according to predetermined criteria.

9. The method of claim 8, wherein the predetermined criteria includes at least one of a time of day, a day of a week or a frequency of the identified current probable location relative to the predetermined area.

10. The method of claim 8, wherein the weighting includes a non-uniform weighting over the predetermined time period.

11. A system comprising:
 an interface for communications with a mobile station via a wireless communication network;
 at least one processor coupled to the interface;
 at least one storage device accessible to the at least one processor; and
 programming for execution by the at least one processor, stored in the at least one storage device;
 wherein execution of the programming by the at least one processor configures the system to perform functions, including functions to:
  identify a current probable location of the mobile station, the current probable location defined by a position of the mobile station and an uncertainty of the position,
  identify a predetermined area which at least partially overlaps the identified current probable location of the mobile station,
  determine a probability distribution of the mobile station proximate to the predetermined area from the position of the mobile station and the uncertainty of the position, wherein the probability distribution includes:
   a first probability distribution associated with a radius of the predetermined area, and
   a second probability distribution associated with the radius of the predetermined area and a distance between the mobile station and a position of the predetermined area,
  estimate a probability that the mobile station is proximate to the predetermined area from the determined probability distribution, wherein the function to estimate includes functions to:
   determine a first plurality of values for the first probability distribution over a range of radius values associated with the predetermined area,
   determine a second plurality of values for the second probability distribution over the predetermined range of radius values,
   combine the first plurality of values and the second plurality of values to form a combined plurality of values,
   determine a mean value of the combined plurality of values, and determine the estimated probability from the mean value, and associate an event for the mobile station based on the estimated probability.

12. The system of claim 11, wherein the function to the determine the second plurality of values includes a function to approximate the second probability distribution by a Bessel function.

13. The system of claim 12, wherein the function to approximate the second probability distribution by the Bessel function includes a function to determine a polynomial approximation of a modified Bessel function of a first kind.

14. The system of claim 11, wherein the function to estimate the probability includes functions to repeat the estimate of the probability over a predetermined time period, to form a plurality of probability estimates.

15. The system of claim 14, wherein the functions to repeat the estimate includes a function to form an aggregate probability estimate from the plurality of probability estimates.

16. A system comprising:
a point of interest (POI) database including location information for a plurality of predetermined areas; and
a location server having an interface for communications with a mobile station via a wireless communication network;
wherein the location server is configured to:
receive a current probable location of the mobile station, the current probable location defined by a position of the mobile station and an uncertainty of the position,
identify, from the POI database, a predetermined area from among the plurality of predetermined areas having corresponding location information which at least partially overlaps the identified current probable location of the mobile station,
determine a probability distribution of the mobile station proximate to the identified predetermined area from the position of the mobile station and the uncertainty of the position, wherein the probability distribution includes:
a first probability distribution associated with a radius of the predetermined area, and
a second probability distribution associated with the radius of the predetermined area and a distance between the mobile station and a position of the predetermined area,
estimate a probability that the mobile station is proximate to the identified predetermined area from the determined probability distribution, wherein to estimate the probability, the location server is configured to:
determine a first plurality of values for the first probability distribution over a range of radius values associated with the predetermined area,
determine a second plurality of values for the second probability distribution over the predetermined range of radius values,
combine the first plurality of values and the second plurality of values to form a combined plurality of values,
determine a mean value of the combined plurality of values, and
determine the estimated probability from the mean value, and
associate an event for the mobile station based on the estimated probability.

17. The location system of claim 16, wherein the location server is further configured to approximate the second probability distribution by a Bessel function.

18. The location system of claim 16, wherein the location server is further configured to determine at least one further estimated probability over a predetermined time period and to form an aggregate probability estimate from the estimated probability and the at least one further estimated probability.

19. The location system of claim 16, further comprising a mobile positioning system configured to identify the current probable location of the mobile station responsive to detecting a communication associated with the mobile station.

20. The system of claim 17, wherein the location server is further configured to determine a polynomial approximation of a modified Bessel function of a first kind.

* * * * *